United States Patent [19]

Redford

[11] Patent Number: 4,958,721

[45] Date of Patent: Sep. 25, 1990

[54] INCLINED BUCKET ELEVATOR

[75] Inventor: Chris R. Redford, Kalamazoo, Mich.

[73] Assignee: The Upjohn Company, Kalamazoo, Mich.

[21] Appl. No.: 211,360

[22] Filed: Jun. 24, 1988

[51] Int. Cl.$^5$ ............................................. B65G 17/36
[52] U.S. Cl. ..................................... 198/710; 198/795
[58] Field of Search ................. 198/795, 710, 803.01, 198/701, 713, 307.1, 509, 465.1; 104/134

[56] References Cited

U.S. PATENT DOCUMENTS

| | | |
|---|---|---|
| 281,746 | 7/1883 | Wittich et al. . |
| 629,707 | 7/1899 | Allen . |
| 776,980 | 12/1904 | Altmann . |
| 865,611 | 9/1907 | Robbins . |
| 872,855 | 12/1907 | Shook . |
| 1,298,115 | 3/1919 | Steere . |
| 1,445,277 | 2/1923 | Hansen . |
| 1,803,367 | 5/1931 | Stevenson . |
| 2,122,036 | 6/1938 | Lindburg . |
| 2,276,978 | 3/1942 | Hyman et al. . |
| 2,318,658 | 5/1943 | Alvey . |
| 2,647,615 | 8/1953 | Lover .................................. 198/710 |
| 2,711,816 | 6/1955 | Reno . |
| 2,907,444 | 10/1959 | Smith . |
| 2,942,557 | 6/1960 | Hirsch et al. ........................ 104/134 |
| 2,944,657 | 7/1960 | Davis et al. . |
| 3,212,625 | 10/1965 | Biehn . |
| 3,312,333 | 4/1967 | Anderson . |
| 3,480,131 | 11/1969 | Holloway . |
| 3,608,701 | 9/1971 | Dieter . |
| 3,678,860 | 7/1972 | Van Veldhuizen ............ 104/134 X |
| 4,019,625 | 4/1977 | Wiese . |
| 4,032,001 | 6/1977 | Hild . |
| 4,162,723 | 7/1979 | Kupper ........................ 198/465.1 X |
| 4,289,228 | 9/1981 | Reim et al. ................... 198/465.1 X |

FOREIGN PATENT DOCUMENTS

| | | | |
|---|---|---|---|
| 0026807 | 2/1984 | Japan .................................. | 198/795 |
| 0371394 | 9/1963 | Switzerland ......................... | 198/701 |

Primary Examiner—Joseph E. Valenza
Assistant Examiner—James R. Bidwell
Attorney, Agent, or Firm—Flynn, Thiel, Boutell & Tanis

[57] ABSTRACT

A bucket conveyor having a guide track, a plurality of independent buckets slidably engaged with the guide track and a driving mechanism that directly engages each bucket of the plurality of buckets during their movement around the guide track. The guide track is provided with a detachable segment which allows the removal of buckets from and the addition of buckets to the bucket elevator.

13 Claims, 4 Drawing Sheets

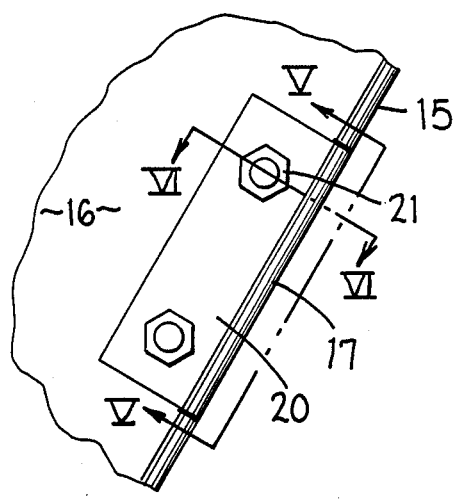
FIG. 4
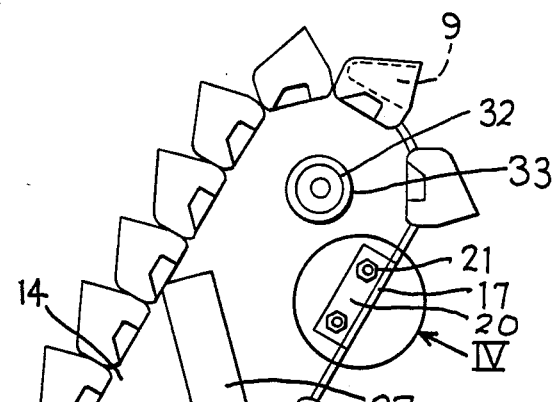
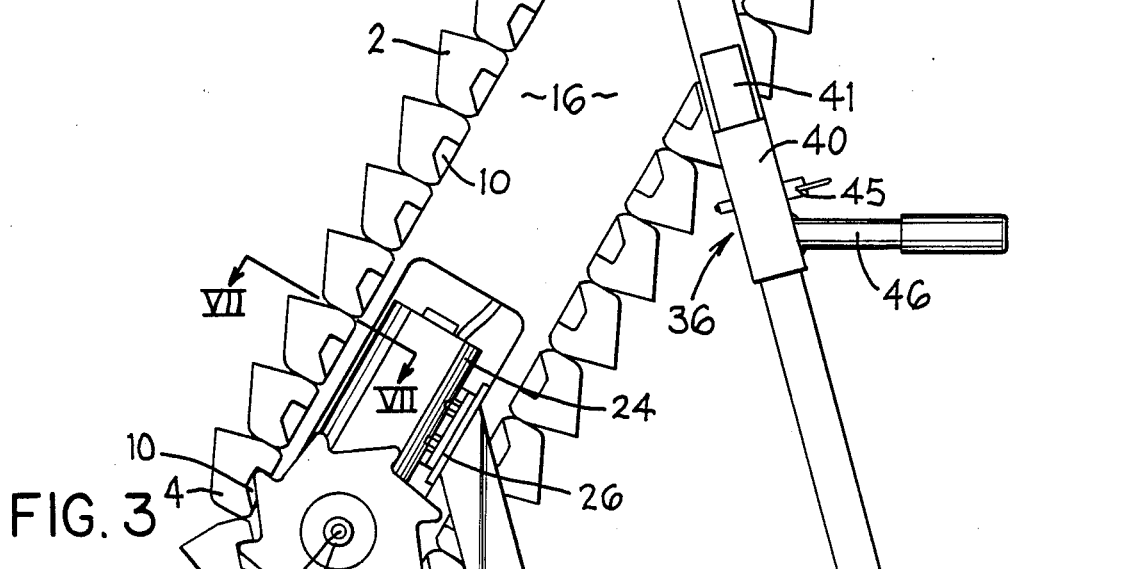
FIG. 3
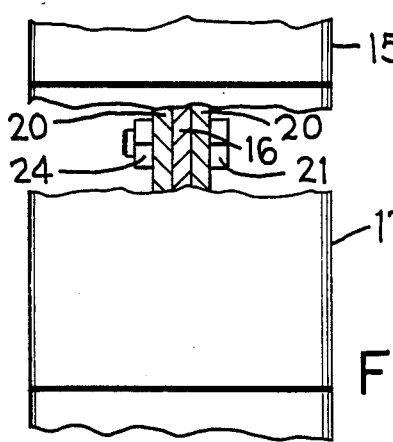
FIG. 5
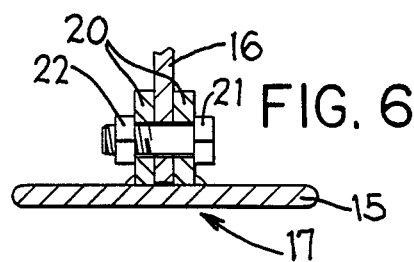
FIG. 6

INCLINED BUCKET ELEVATOR

BACKGROUND OF THE INVENTION

(1) Field Of The Invention

The invention relates to an inclined bucket elevator which can receive loose materials or articles at a low elevation, raise and transfer them, and then discharge them at a higher elevation. The bucket elevator, according to the invention, comprises a plurality of independent, slidable, unconnected, free buckets which can be slid along an endless inclined track. The buckets can be removed from the elevator by use of a detachable track section.

(2) Description of The Prior Art

Bucket elevators, according to the prior art, typically comprise one or more endless bucket carriers, such as chains, driven by suitable drive means, such as upper and lower sprockets, and having open-topped buckets attached thereto at selected positions thereon. During their ascending movement, the buckets carry loose material or articles from a lower to a higher elevation at which the material is discharged. The buckets are returned to the lower elevation in an inverted condition and thereafter they become upright again for refilling and then repeating the cycle of operation.

Chain-type and belt-type bucket elevators are generally cumbersome, noisy in operation, and require frequent maintenance and lubrication. Moreover, connecting the buckets or other load-carrying members to a chain or chains not only contributes to the cost of manufacturing the conveyor, but also the links of the chain or other parts of the connecting structure elements are prone to frequent breakage which interrupts the operation of the conveyor.

The prior art bucket elevators are also unsatisfactory for use in situations in which a high degree of cleanliness and the maintenance of sterile conditions are required, such as in the pharmaceutical industry. For example, in the pharmaceutical industry, in some situations it is desired to use an inclined bucket elevator to elevate and transport pills, tablets or capsules from a low discharge point of one machine to a hopper for an adjacent machine or to a large drum. Since the buckets are typically connected to a driving chain or chains by pivot or link mechanisms, it is difficult to completely clean and sanitize these prior art bucket elevators. It is difficult to remove the buckets from the driving chain or chains and, therefore, the buckets cannot easily be sanitized.

Another problem with the prior art elevators used in the pharmaceutical industry is that unit dosage forms, such as tablets, typically leave a machine, for example, a tablet compressing machine, at an elevation which is so low that they cannot be fed into the prior art bucket elevators. As a result, in the past, the tablets have been discharged into small receiving boxes and, from time to time, the tablet press operators then manually dumped the contents of those small boxes into a larger container. The small receiving boxes are likely to fill up within a short period of time and a large amount of operator time is required to monitor and dump those small boxes. Therefore, there is a need for a bucket elevator which can receive objects, for example, tablets, at a low elevation, elevate and transport them, and then discharge those objects at a higher elevation, and which requires minimum maintenance and is readily capable of complete cleaning and sanitization of the buckets with a minimum amount of difficulty.

SUMMARY OF THE INVENTION

The invention provides an inclined bucket elevator having an endless guide track, a series of independent, unconnected, free buckets slidably engaged with and guided by said endless guide track and a bucket-drive mechanism for directly engaging the buckets and sliding them along the track.

In a preferred embodiment of the present invention, the endless guide track is provided with a detachable section which allows each bucket to be independently removed from the track. This makes possible easy cleaning of the guide track and the buckets and sanitization of the buckets.

In the preferred bucket-drive mechanism, the buckets are serially directly engaged by sprocket means and are pushed upwardly to the upper end of the guide track whereat the contents of the buckets are discharged. The buckets then fall downwardly, by gravity, onto a queue or lineup of buckets awaiting refilling. Preferably, the inclined bucket elevator of the present invention is portable. It can be provided with handles and wheels so that it can be transported from one location to another.

BRIEF DESCRIPTION OF THE DRAWINGS

FIG. 3 is a side view, corresponding to FIG. 1, of the bucket elevator with the bucket guide plates removed.

FIG. 4 is an enlarged view of the circled portion IV of FIG. 3 and showing the detachable conveyor track segment.

FIG. 5 is a partially broken away view taken along the line V—V of FIG. 4.

FIG. 6 is a sectional view taken along the line VI—VI of FIG. 4.

FIG. 9 is a sectional view showing the mounting of the lower guide plate onto the sprocket shaft.

PREFERRED EMBODIMENT OF THE INVENTION

The bucket elevator 1, according to the invention, is an elongated free-standing structure, the lengthwise extent of which is inclined with respect to the vertical. The bucket elevator 1 comprises a series of independent, unconnected, free buckets 2 which are mounted on an upright, inclined, endless guide track 14 for sliding movement lengthwise therealong, the track 14 being stationary with respect to the buckets 2. The buckets 2 are not connected to each other or to a movable chain or belt, but rather, they are free of fixed interconnection to each other and to the track 14 and they are supported so that they can independently slide with respect to said track through an endless path defined by said track.

Figure 7:
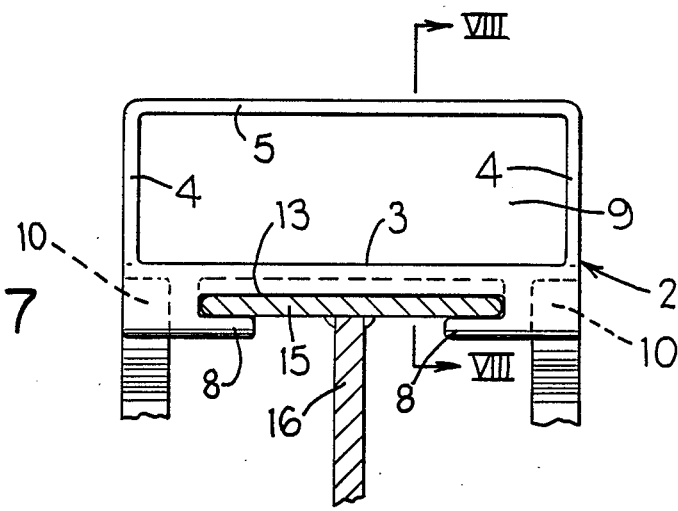
FIG. 7 is a sectional view taken along the line VII—VII in FIG. 3, showing the slidably guided arrangement of the buckets on the guide track.
Figure 8:
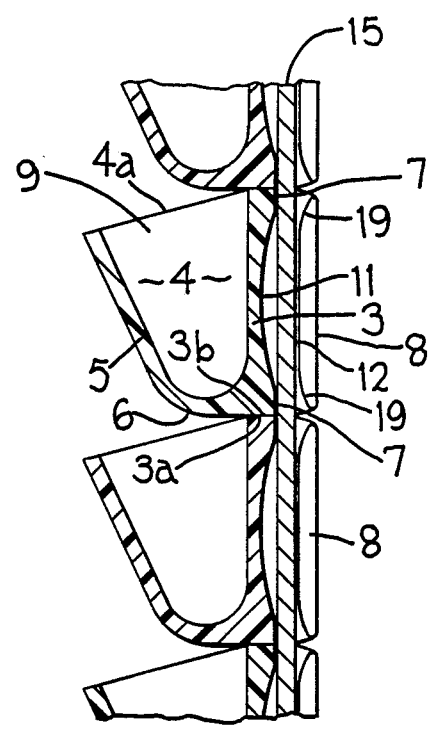
FIG. 8 is a sectional view taken along the line VIII—VIII of FIG. 7, showing the slidably guided mounting of the buckets on the guide track.

Referring to FIGS. 7 and 8, each of the buckets 2 includes a rear or inner wall 3, a pair of opposing end walls 4, a front wall 5 opposed to said rear wall and a bottom wall 6. The walls 3, 4, 5 and 6 define an upwardly opening, closed-bottom, material-receiving cavity 9 therein. As best shown in FIG. 8, the upper edges 4a of the end walls 4 slope downwardly in a direction extending away from the track 14. The upper and lower edges 3a and 3b of the rear wall 3 extend at the same angles, here perpendicularly, to the track 14 so that the upper edge 3a of the rear wall of each bucket bears directly against the lower edge 3b of the rear wall of the adjacent upper bucket. Thus, each bucket directly engages the buckets positioned above and below it so that the buckets can be pushed upwardly along the upper reach of the guide track 14. Each bucket 2 can be made from separate pieces which are secured together by suitable means, such as by an adhesive. The buckets 2, however, preferably are made of a one-piece molding of a suitable synthetic resin, such as Delrin ®.

As best shown in FIGS. 3 and 7, polygonal, sprocket-engaging recesses 10 are provided at the opposite lateral ends of the rear walls 3 of the buckets 2. The polygonal recesses 10 are adapted for receiving the teeth 30 of the drive sprockets 23. As shown in FIG. 3, the recesses 10 are open on their rearward or inner sides and they are shaped so that the sprocket teeth 30 can enter thereinto and move the buckets 2 upwardly.

As shown in FIGS. 7 and 8, the central portion of the rear wall 3 of the bucket 2 has a slot 13 which is open on the rear side of the bucket. The outer guiding rail 15 of the guide track 14 is received in the slot 13 whereby the bucket 2 is supported for lengthwise sliding movement along the guide track 14. A pair of opposed lips 8 retain the rail 15 in the slot 13.

As shown in FIG. 8, the portion of the rear wall 3 that defines the front surface of the slot 13 has flat upper and lower end surfaces 7 and an intermediate arcuate surface 11 defining a slightly concave cavity. Each of the bucket lips 8 has an intermediate flat surface 12 and curved surfaces 19 at the upper and lower ends thereof. The planar inner and outer surfaces of the rail 15 slidingly contact and guide the flat surfaces 7 and 12 when the buckets 2 are being moved along the straight portions of the guide track 14. When the buckets 2 are being moved around the reversely curved end portions of the guide track, the curved surfaces 11 and 19 cooperate with the arcuate portions of the rail 15. Thus, the buckets 2 are slidably guided by the guide rail 15 and are free to pass over the flat portions and curved portions of the guide rail 15 without binding.

The guide track 14 has two flat, parallel reaches joined by reversely curved upper and lower end sections. The track 14 is upright and its longitudinal axis is inclined with respect to the vertical. The outer rail 15 of the track is joined to a central web 16 and extends perpendicular thereto. The track 14 can be of unitary construction or the rail 15 may be attached to the web 16 by any suitable method, such as welding. The material of construction of the track 14 can be any suitable material and an especially preferred material is stainless steel.

Figure 1:
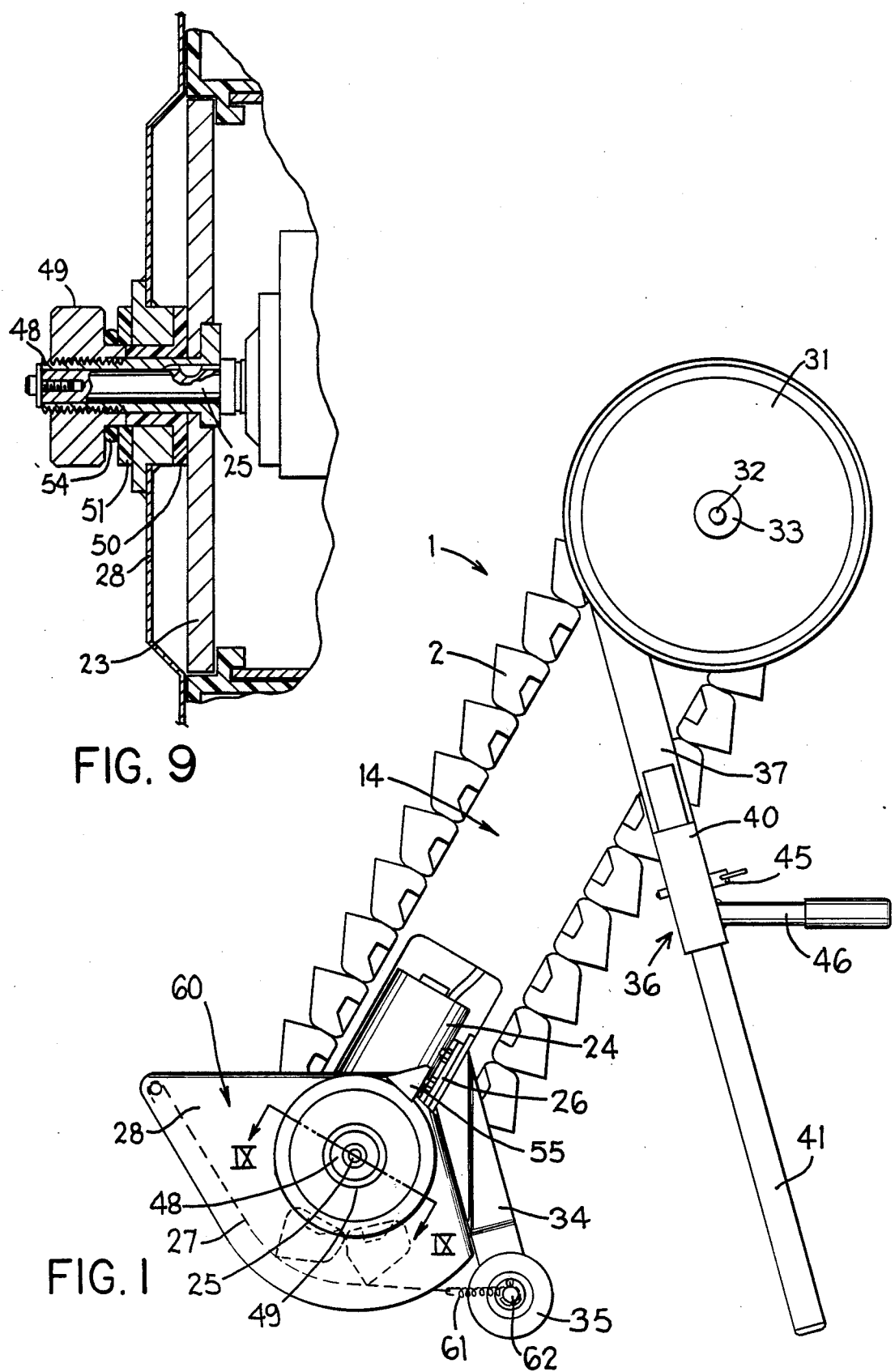
FIG. 1 is a side view of a bucket elevator, according to the present invention.
Figure 2:
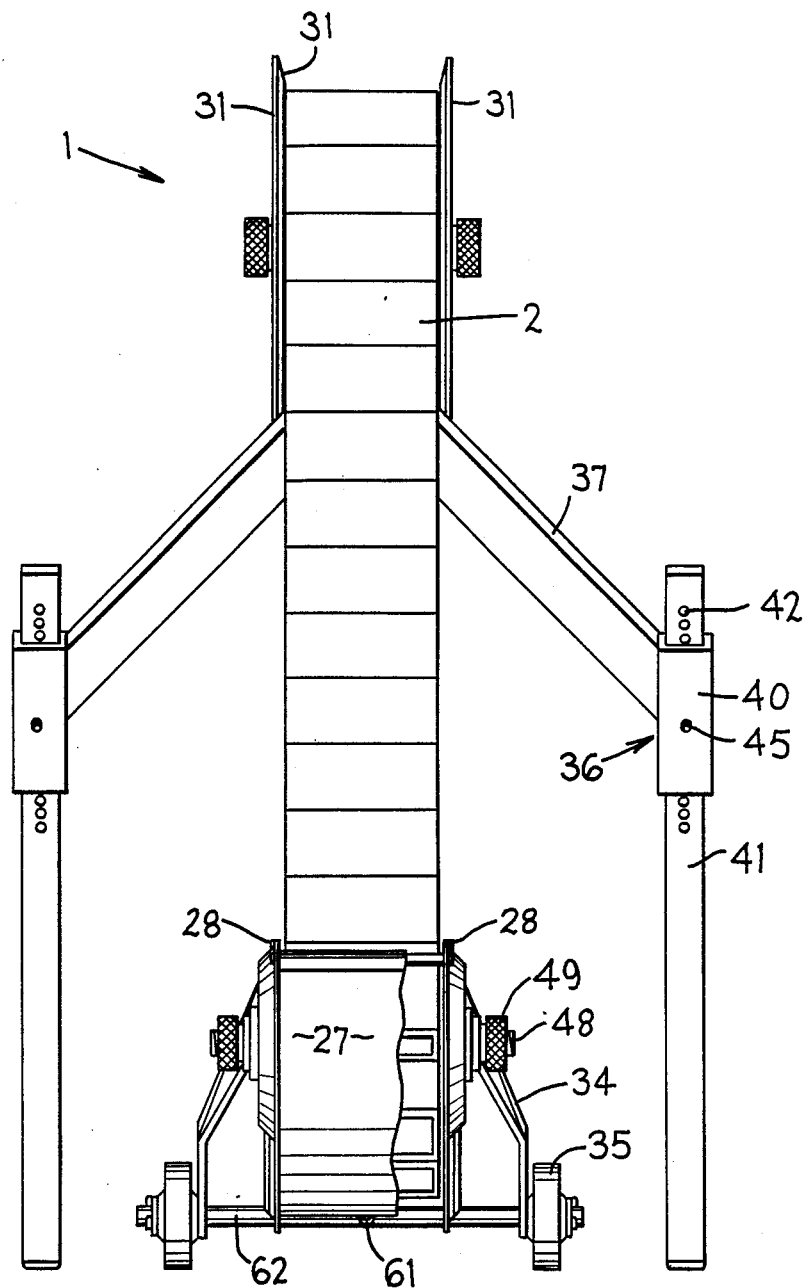
FIG. 2 is a front view of the bucket elevator according to the present invention.

Referring to FIGS. 1 and 2, the bucket elevator 1 is provided with an upper pair of guide plates 31. A lower pair of guide plates 28 is provided for covering the sprockets 23. The upper guide plates 31 and the lower guide plates 28 can be of any suitable shape but are shown in the figures as having a substantially flat, pan-like shape. A strip of metal 27 extends between and contacts the opposing surfaces of the lower guide plates 28 and defines therewith a feed chute 60 in which the items to be conveyed are adapted to be contained. The strip of metal 27 and the lower guide plates 28 respectively slidably contact the front 5 and sides 4 of the buckets 2 to prevent spilling of the material to be conveyed. A spring 61 connects the bottom edge of the metal strip 27 to a wheel axle 62 in order to urge said strip against the buckets 2 during their upward movement through the feed chute 60.

Referring to FIG. 3, drive sprockets 23 are mounted on the opposite axial ends of a shaft 25 which is driven by a motor 24. The sprockets 23 are located at the lower reversely curved portion of the guide track 14. The sprockets 23 have teeth 30 which are adapted to extend into the recesses 10 formed in opposite lateral sides of the buckets 2 when the buckets travel around the lower reversely curved portion of the guide track 14. The sprockets 23 are rotated, clockwise as appearing in FIG. 3, so as to lift each bucket 2 to a point on the conveyor track where the teeth 30 disengage from the bucket recesses 10. Successive teeth 30 of the sprockets 23 engage with successive buckets 2 in the queue of buckets and the buckets 2 are thereby serially propelled upwardly along the upper reach of conveyor track 14, with each bucket pushing upwardly on the adjacent upper bucket.

The inclined bucket elevator of the present invention is supported by a pair of lower legs 34 and a pair of upper legs 36. Each upper leg 36 is comprised of an upper fixed leg section 37, a sleeve 40 secured to the lower end of said fixed leg section and a lower leg section 41 which is slidable in said sleeve. The fixed leg 37 is attached to the guide track 14 toward the upper end thereof. The lower slidable leg section 41 is releasably secured in a vertically adjustable position in the sleeve 40. The discharge height and angle of inclination of the inclined bucket elevator 1 can be adjusted by varying the vertical position of the lower slidable leg section 41 in the sleeve 40. The sleeve 40 is provided with a through hole and the slidable leg section 41 is provided with a series of vertically spaced-apart holes 42 into which a pin 45 can be inserted in order to lock the upper legs 36 at the desired height. A handle 46 (FIG. 3) can optionally be attached to each sleeve 40 in order to facilitate manual movement of the inclined bucket elevator 1 from one location to another. The handles 46 also function as means for positioning a drum for receiving the objects that are discharged from the upper end of the elevator.

The lower legs 34 are attached to the motor mount 26 and are provided with wheels 35 mounted on an axle 61 in order to aid in the transportation of the inclined bucket elevator 1 from one location to another.

The upper guide plates 31 are attached to a mounting shaft 32 which is mounted on the guide track 14. The opposite ends of the mounting shaft 32 are threaded and threaded collars 33 are threaded onto the mounting shaft 32 to secure the upper guide plate 31 in place.

Referring to FIG. 1, the feed chute 60 is provided for feeding the material or objects, such as tablets, into the open upper ends of the buckets 2 as they move around the lower reversely curved portion of the track 14. The buckets 2 are driven upwardly by the sprockets 23 through the feed chute 60, where the materials or objects to be elevated are introduced into the buckets 2. The buckets 2 are then pushed upwardly to the reversely curved upper end portion of the guide track. After the buckets 2 have been moved approximately half-way around the reversely curved upper end portion of the guide track 14, the contents of the buckets are discharged by gravity, for example, into a container (not shown). The buckets 2 free-fall along the upper portion of the lower reach of the conveyor track 14 and join the lineup of buckets 2 awaiting engagement with the drive sprockets 23. The buckets 2 may be provided with padding (not shown) at the point where the bottom of a bucket 2 meets the top of a succeeding bucket 2 in order to reduce the noise of operation.

Referring to FIGS. 3-6, the track 14 has a detachable segment 17. The detachable segment 17 comprises a pair of flanges 20 which are releasably secured to the web 16 of the track 14 by any suitable means, such as by threaded bolts 21 which are inserted into holes provided in the flanges 20 and the central web 16. A nut 22 is screwed on the bolt 21 in order to secure the detachable segment 17 to the web 16.

As shown in FIG. 9, the sprocket 23 is mounted on a sprocket shaft 48 which in turn is secured to the motor shaft 25 by a key. A spacer bushing 50 separates the sprocket 23 from the lower guide plate 28. A washer 51 and an O-ring 54 are provided between the lower guide plate 28 and the sprocket shaft collar 49. The collar 49 is screwed onto the sprocket shaft 48 and secures the sprocket 23 and the lower guide plate 28 onto the sprocket shaft 48.

The motor 24 is attached to a motor mount 26 which is secured to the conveyor track 14. The motor 24 has a conventional speed reducer (not shown) driving the shaft 25 on which the sprockets 23 are mounted. A conventional variable speed drive control (not shown) can be provided for controlling operation of the motor. The variable speed drive control can be mounted on the conveyor 1 or permanently on a wall near the area in which the conveyor is used.

DESCRIPTION OF OPERATION

In operation, a queue of buckets 2 is formed on the lower reach of the track 14 and upstream of the drive sprockets 23. The buckets 2 are successively engaged by the sprockets 23 and are moved thereby around the curved lower portion and thence upwardly along the upper reach of the guide track 14. The sprocket teeth 30 extend into the recesses 10 provided in opposite sides of each bucket. Each bucket is lifted by the sprocket teeth 30 to a point on the guide track 14 where the sprocket teeth 30 disengage from the bucket recesses 10. The following buckets in the queue move downwardly along the lower reach of the guide track 14, by their own weight and the weight of buckets behind, to a location at which they are engaged by the sprocket teeth.

Each bucket 2 is driven, by the sprockets 23, around the lower reversely curved portion of the guide track 14 and thence upwardly onto the lower end of the upper reach of the guide track. The buckets are thereby pushed in series through the feed chute 60. The materials or objects to be conveyed thereby fill each bucket as the bucket moves through the feed chute 60.

Each bucket pushes the buckets above it upwardly along the guide track 14 so that the buckets are moved to the upper end of the track 18. The material being conveyed is discharged after the buckets have moved approximately halfway around the upper reversely curved portion of the guide track. In the preferred illustrated embodiment wherein the guide track 14 is not completely filled with buckets, empty buckets then free-fall, in an inverted condition, along the conveyor track 14 and join the queue of buckets upstream of the sprockets 23. If the guide track 14 is completely filled with buckets, then the buckets will be pushed through the endless path. This latter embodiment is a less preferred embodiment of the invention because the discharge of the contents of the buckets will be interfered with and the power requirements for operating the elevator will be increased.

The speed of rotation of the sprockets 23 can be adjusted. Thus, the speed of movement of the buckets 2 along the guide track 14 can be adjusted as needed to provide the desired flow rate of the material or objects being conveyed. For example, the buckets 2 can be moved at a relatively high speed sufficient to throw the contents thereof clear of the elevator at the upper end thereof. Alternatively, the buckets 2 can be moved at a relatively slow speed to discharge the contents thereof substantially vertically downwardly when the buckets move past the upper reversely curved end of the track.

Changes may be made in the construction and arrangement of the parts or elements of the preferred embodiment disclosed herein without departing from the spirit or scope of the invention as defined in the following claims.

I claim:

1. A bucket elevator comprising: a stationary guide track defining an endless path; a series of movable buckets slidably mounted on said track for movement through said path, each bucket being free from fixed mechanical connection to the other buckets and said track and having a slot provided with two lip members which slidably engage said guide track; and drive means drivingly engageable with said buckets for moving said buckets in series through said path.

2. The bucket elevator of claim 1, wherein said drive means comprise a pair of sprockets which directly engage with depressions provided in opposite sides of said buckets.

3. The bucket elevator of claim 1, wherein said guide track has a detachable segment by which each bucket of said plurality of buckets can be independently removed therefrom.

4. The bucket elevator of claim 1, wherein said endless path is of ellipsoidal configuration.

5. The bucket elevator of claim 1, wherein said buckets are driven by said drive means to an uppermost point on said path after which they move downwardly by the force of gravity.

6. The bucket elevator of claim 1, wherein said slot has a curved surface and flat surfaces which slidably engage said guide track.

7. The apparatus of claim 1, wherein each of said two lip members has curved surfaces and a flat surface which slidably engage said guide track.

8. A bucket conveyor comprising: a stationary guide track defining an endless path; said track comprising a web and an outer guiding rail perpendicular to said web, said track having a detachable segment; a series of buckets slidably engaged with said outer guiding rail, each bucket being independently movable along said outer guiding rail through said path; and a pair of drive sprockets that are received in depressions provided in opposite sides of said buckets and move said buckets with respect to said rail.

9. The apparatus of claim 8, wherein said buckets are driven by said pair of drive sprockets to an uppermost point on said path after which they fall downwardly along said rail solely by the force of gravity.

10. The apparatus of claim 8, wherein said buckets have a side having a slot provided with two lip members which slidably engage said guide track.

11. The apparatus of claim 10, wherein said slot has a curved surface and flat surfaces which slidably engage with said guide track.

12. The apparatus of claim 10, wherein each of said two lip members has curved surfaces and a flat surface which slidably engages said guide track.

13. A bucket elevator comprising: a stationary guide track defining an endless path, said guide track having a detachable segment and comprising an outer rail and a web, said outer rail being perpendicular to said web and said detachable segment having a pair of flanges that overlap said web and are releasably secured thereto; a series of movable buckets slidably mounted on said track for movement through said path, each bucket being free from fixed mechanical connection to the other buckets and said track and independently removable from said track by way of said detachable segment; and drive means drivingly engageable with said buckets for moving said buckets in series through said path.

* * * * *